Figure 1:
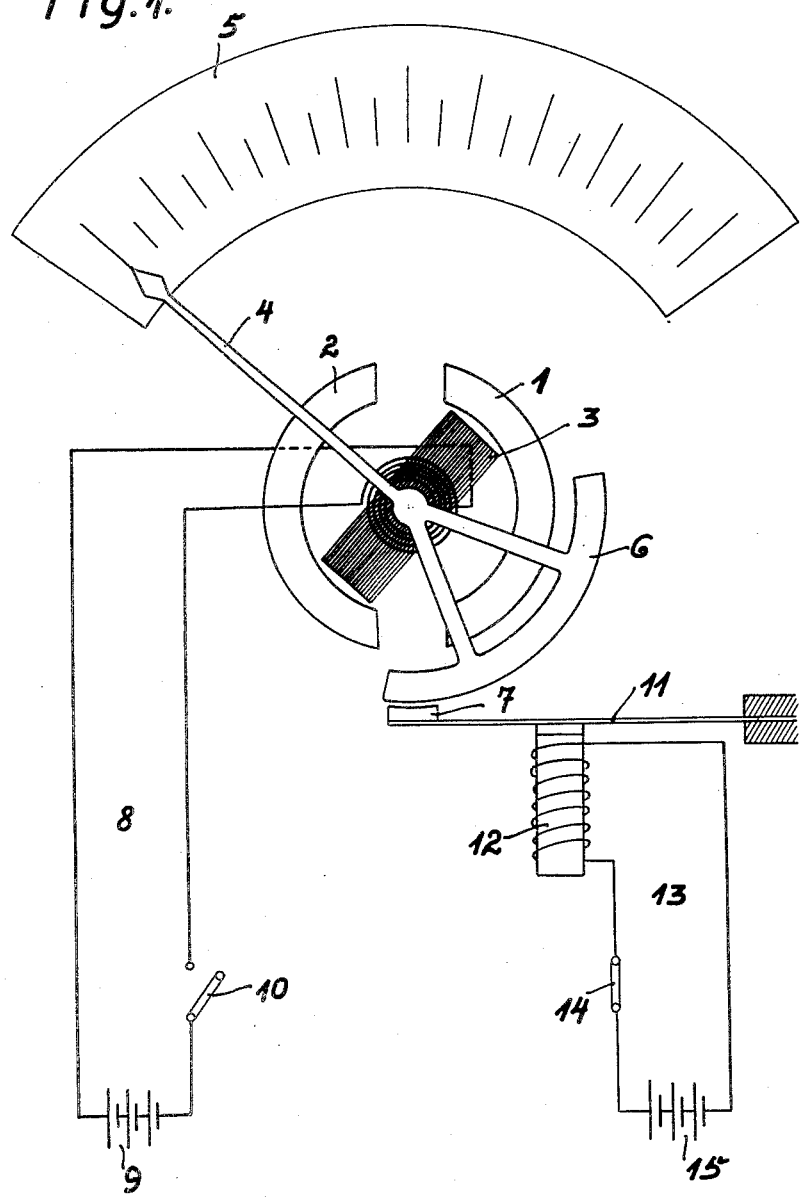

May 20, 1930.    W. KUNZE    1,759,648
METHOD OF AND MEANS FOR MEASURING SHORT INTERVALS OF TIME
Filed Aug. 11, 1924    3 Sheets-Sheet 1

May 20, 1930.  W. KUNZE  1,759,648
METHOD OF AND MEANS FOR MEASURING SHORT INTERVALS OF TIME
Filed Aug. 11, 1924  3 Sheets-Sheet 3

Patented May 20, 1930

1,759,648

UNITED STATES PATENT OFFICE

WILLY KUNZE, OF BREMEN, GERMANY, ASSIGNOR TO SUBMARINE SIGNAL COMPANY, OF BOSTON, MASSACHUSETTS, A CORPORATION OF MAINE

METHOD OF AND MEANS FOR MEASURING SHORT INTERVALS OF TIME

Application filed August 11, 1924, Serial No. 731,522, and in Germany August 18, 1923.

The present invention relates to a method of measuring short intervals of time, for cases in which the beginning and end of the time to be measured are given by electrical current effects. Apparatus has hitherto been employed for this purpose wherein, through the action of the electric current, at the beginning of the period to be measured, a mechanical force (the force of a spring) was released, which set in rotation a wheel, the movement of which was braked at the end of the time.

One disadvantage of such an arrangement is that the stress in the spring is subject to variations according to temperature, so that the impulse imparted to the wheel varies in strength, and this becomes evident even in the measurement of very small periods of time. Furthermore, such an instrument is only intended for a very limited range of measurement, so that for another range of measurement, a larger range for example, a further instrument must be employed.

These disadvantages are eliminated by the process and the apparatus according to the invention, as the instrument is made independent of variations in temperature and it is made possible to embrace different ranges of measurement in one and the same instrument.

The essence of the invention consists in the feature that an electrical action at the commencement of the period to be measured directly effects the movement procedure, and does so in such a way that the movable system of a piece of apparatus constructed in the manner of an electrical measuring instrument is set in motion directly by the action of a current flowing through the instrument and is arrested at the end of the period to be measured by a braking device. In the simplest case the measuring instrument is switched on at the beginning of the period to be measured, so that a current flows through it, and the movable system, which is provided with an indicating device or the like, is set in motion. This motion is braked at the end of the period to be measured by a braking device applied to the movable system, which is released for example by an electrical relay, and the path or angle traversed by the moved system serves as a measure of the period.

For the present purpose all kinds of electrical measuring instruments may be employed, particularly for example rotating-coil instruments, electro-magnetic and hot-wire instruments. Ordinary needle instruments can be used just as well as mirror galvanometers. It is only necessary, for the present purpose, to arrange a small braking device in such a way that the movement of the movable system can be instantly arrested at any time.

It is important to be able to choose the current switched on to the instrument stronger or weaker without difficulty and in this way to be able to cause the movable system to move with greater or smaller velocities. The scale of the instrument can in this way be used for various orders of magnitude of the length of time to be measured; the readings then merely have to be multiplied in each case by a corresponding factor, or different graduations may be provided.

The accompanying drawings illustrate the process more fully by way of example in the case of an ordinary rotating-coil instrument.

Figure 1 shows the instrument before the measuring is begun; and

Figure 2:
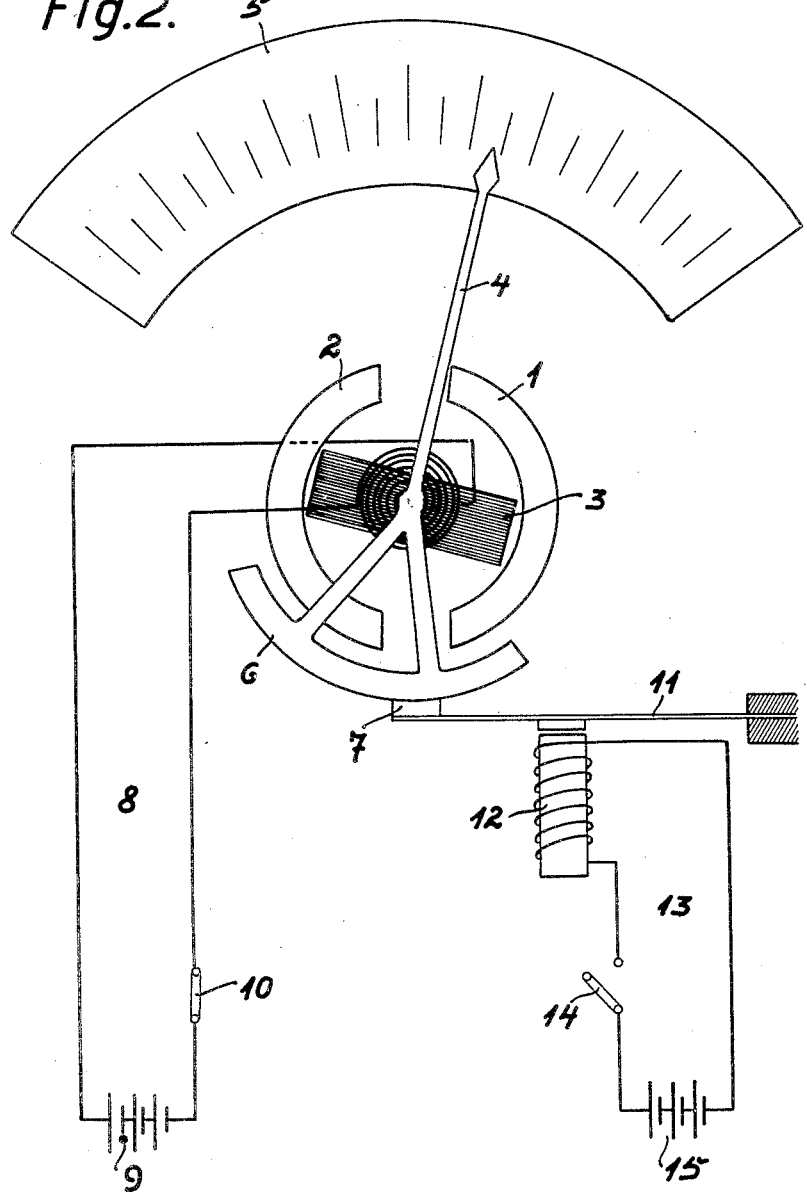

Figure 2 when the measuring is ended.

Figure 3:
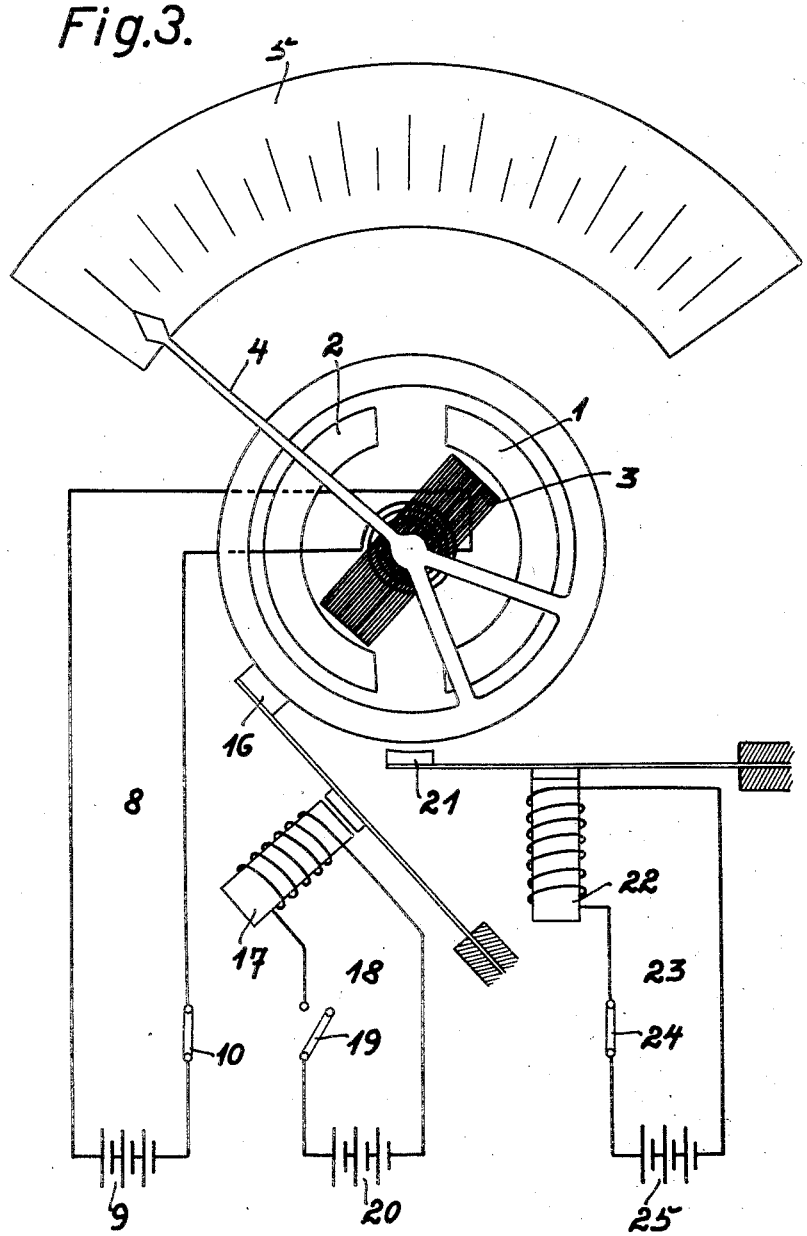

Figure 3 shows a somewhat modified constructional form.

Between permanent magnets 1 and 2 is located a movable coil 3 with a needle 4 which moves over a scale 5. To the opposite end of the needle is fixed a segment 6, to which a brake block 7 can be applied. The coil 3 is connected, through a circuit 8, which includes a key 10 or the like, with a source of electric current 9. The brake block is mounted on a resilient arm 11, which is under the control of an electro-magnet 12, with circuit 13, key 14 or the like, and source of current 15.

The procedure for measuring is as follows:—

At the commencement of the interval of time to be measured the circuit 8 is closed by means of the key 10, so that a current of definite strength flows through the instrument. The movable system is set in motion with a velocity dependent upon the strength of the current. At the end of the interval of time to be measured the brake block 7 is applied to the segment 6, in consequence for example of the circuit 13 of the electro-magnet 12 being interrupted by the key 14 and releasing the spring. The needle 4 is instantly checked in its movement and indicates on the scale a throw which forms a measure of the interval to be measured. The final position is shown in Figure 2. In order to make the apparatus ready for a fresh measurement all that is required is to open the switch 10 and to reclose the switch 14. The strength of the current flowing through the instrument is so dimensioned that the instrument attains with certainty its maximum throw, unless the brake is previously applied to the system.

In another form in which the process may be carried out the movable system is fully energized in the zero position of the needle, but its movement cannot begin because it is held fast by the brake block 16 of an electrical relay 17, 18, 19, 20. Not until the switch 19 of this relay closes is the movable system set in motion, and can be braked at the end of the time to be measured by the brake block 21 of another relay 22, 23, 24, 25 for example by opening the switch 24, or by means of the previously mentioned relay 16, 17, 18, 19, 20 for example by opening the switch 19.

In a corresponding manner all kinds of measuring instruments wherein a movement is released by the action of a current may be employed for the present purpose.

What I claim is:—

1. An apparatus for measuring short time intervals, comprising a pivoted coil for carrying electric current, an indicator rotated by the rotation of said pivoted coil, said indicator having a pointer at one end and a segment at the other, means for setting up a permanent magnetic field relative to an initial position of said coil, means for applying a torque to said coil to cause the rotation of the same at the beginning of the time interval to be measured, braking means applied to the periphery of said segment for stopping and holding said indicator at the end of the time interval to be measured, and a scale for reading the time interval.

2. An apparatus for measuring short time intervals, comprising a pivoted solenoid, a pivoted indicator rotated by movement of said solenoid and having a pointer at one end and a circular segment at the other, means for setting up a permanent magnetic field relative to said coil, means for energizing said solenoid and brake means applicable to said circular segment for stopping said indicator when in motion.

3. An apparatus for measuring short time intervals, comprising a plurality of curved magnets mounted in a circle, a solenoid pivoted at the center of said circle, an indicator carried by said solenoid, said indicator having at one end a circular segmental rim, and brake means adapted to exert pressure on said rim to bring said indicator to rest.

In testimony whereof I affix my signature.

WILLY KUNZE.